(No Model.)
D. C. BOLEY.
THREAD PROTECTING ATTACHMENT FOR SPOOLS.
No. 421,478. Patented Feb. 18, 1890.
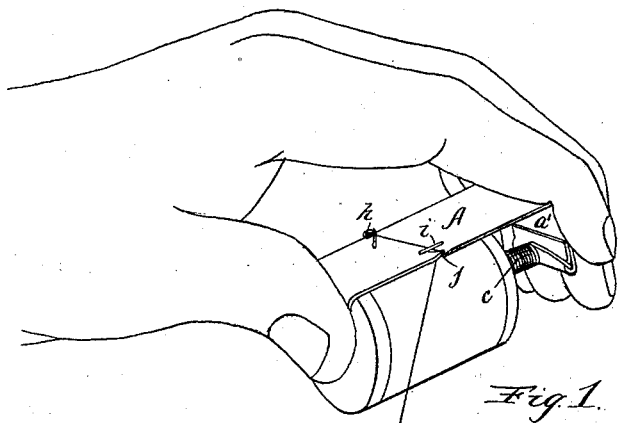
Fig. 1.
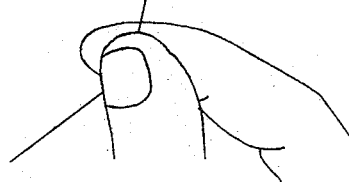
Fig. 2.
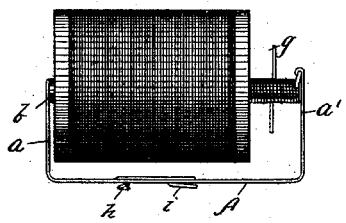
Fig. 3.
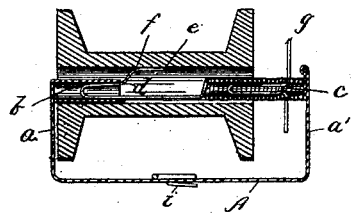
Fig. 4.
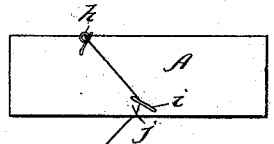
Fig. 5.
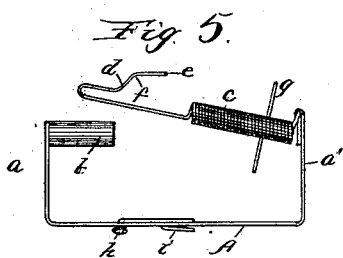
Witnesses:
Sew. C. Curtis
H. W. Munday
Inventor:
Daniel C. Boley
By Munday Evarts & Adcock
His Attorneys

UNITED STATES PATENT OFFICE.

DANIEL C. BOLEY, OF CHICAGO, ILLINOIS.

THREAD-PROTECTING ATTACHMENT FOR SPOOLS.

SPECIFICATION forming part of Letters Patent No. 421,478, dated February 18, 1890.

Application filed May 17, 1889. Serial No. 311,102. (No model.)

*To all whom it may concern:*

Be it known that I, DANIEL C. BOLEY, a citizen of the United States, residing in Chicago, in the county of Cook and State of Illinois, have invented a new and useful Improvement in Thread-Protecting Attachments for Spools, of which the following is a specification.

This invention relates to a holder in which a spool of thread may be inserted, and which will prevent unwinding of the thread when such is not desired by holding the spool against turning.

The device consists, primarily, in a U-shaped frame wherein the spool is held upon one or more pivots, and which is provided with a friction-exerting spring engaging the spool and preventing its rotation, such friction device being readily releasable whenever the thread is to be drawn off by pressing the arms of the frame toward each other. These several features, as well as other details of construction, I have shown in the accompanying drawings, wherein—

Figure 1 is a perspective view of the device in use. Fig. 2 is a front elevation. Fig. 3 is a central longitudinal section. Fig. 4 is a top view, and Fig. 5 is a side elevation, of the thread-holder detached.

In said drawings, A represents a U-shaped frame, preferably of spring metal, but which may be made of any other material having flexibility combined with the strength requisite. The arm $a$ of this frame carries a tubular pivot $b$. The arm $a'$ carries another pivot $c$, which I prefer to make of coiled wire, as that enables me to form upon the free end of it a friction-spring $d$. This pivot $c$ is inserted in the central opening of the spool at one end, and the arms are then sprung apart sufficiently to allow the pivot $b$ to be inserted in the spool at the other end. The parts being then released, the spring $d$ will enter within the hollow pivot $b$, as shown at Fig. 3, with its outstanding end $e$ bearing against the interior surface of the spool. It will now be seen that the spool will be held by the friction of the spring against rotation, so that the thread cannot become unwound. When, however, it is desired to draw off any portion of the thread, the friction of the spring is released by pressing the arms $a$ and $a'$ toward each other, which can be done by taking hold of the device in the manner illustrated at Fig. 1, this operation resulting in forcing the spring within the pivot $b$ and causing a collapse or drawing in of the outstanding point $e$. It will be noticed that the spring has an inclined portion at $f$, designed to bring about this result when the spring is forced into the pivot $b$. The releasing of the pressure by the fingers upon the arms of the frame results in the return of the parts to their normal position (indicated at Fig. 3) and a renewal of the friction upon the spool.

To adapt the device to spools of different lengths, (the diameter being a matter of indifference,) I provide a stop which will prevent any excess of longitudinal movement by the spool after it has been placed upon the pivots. This stop may consist of a piece of wire $g$ bent to a T shape, with the stem placed longitudinally within the hollow of the coil-pivot $c$ and the arms projecting out between the individual members of the coil. A stop thus constructed is easily adjusted, as the coil will act as a screw to move the stop in either direction, according to the direction in which the arms of the stop are turned.

When the arms of the frame are pressed toward each other, as in Fig. 1, it is desirable that no friction should be exerted upon the spool, and to prevent any such result by reason of the gripping of the spool between the arms of the frame or between the stop and one of the arms I make the spring $d$ to extend to such a point as to insure its striking the arm $a$ when the parts are thus pressed upon preparatory to withdrawing the thread.

While the thread cannot become unwound accidentally, because the friction prevents any rotation of the spool with the parts thus far described, I prefer to employ with the device means for holding the end of the thread, so that it can be readily found and taken hold of when a fresh length is to be drawn off. These means may consist of an eye $h$, open at one side, within which the thread may be readily passed, and a holding-spring $i$, under which the end may be slipped. This latter spring clamps the end of the thread upon the flat portion of the frame and holds it securely, so that it cannot become accidentally dislodged or free. In immediate proximity to this spring $i$ a slit may be made in the metal of the frame, as shown at $j$, whereby the thread may be severed after a needle-charge has been unwound.

The pivot $c$ may be hung to the arm $a'$ by forming a loop upon the pivot and bending the end of the arm over such loop. This method of attaching, however, I do not regard as essential. The pivot $b$ may be either integral with the arm $a$ or made of a separate piece of metal and properly secured to said arm.

Of course it will be understood that in pressing the arms of the frame together to give freedom to the spool only one of said arms needs to yield. The preferable and cheaper construction, however, is that illustrated, where the entire frame is made of one piece of spring metal.

I claim—

1. The frame for holding spools of thread, consisting of a U-shaped flexible frame, a pivot carried upon one arm of the frame, and a spring supported from the other arm, the spring being adapted to exert friction upon the interior of the spool, and being releasable by said pivot, substantially as set forth.

2. The combination, with the U-shaped flexible frame, of the hollow pivot $b$, the pivot $c$, and the friction-spring $d$, adapted to enter pivot $b$, substantially as set forth.

3. The combination of the U-shaped flexible frame, the pivots $b$ and $c$, and the spring $d$, the latter being of such length as to come in contact with the arm of the frame and prevent friction upon the spool when the arms of the frame are pressed together, substantially as set forth.

4. As a new article of manufacture, a spool-holding frame having pivots, as set forth, and provided with a friction-spring carried upon one of said pivots, and the other pivot being provided with means for releasing the said friction-spring at the will of the operator, substantially as set forth.

5. The combination, with a spool, of a holder consisting of a U-frame of flexible material and longer than the spool to permit the arms to be pressed toward each other without contact with the ends of the spool, a pivotal support for the spool, and a friction-spring releasable by contact with the pivot when the arms are thus pressed, substantially as set forth.

6. As a new article of manufacture, an individual spool-holder consisting of a flexible U-frame, a pivot upon each arm of the frame, and a stop $g$ upon one of the pivots, substantially as set forth.

7. As a new article of manufacture, the spool-holder consisting of the flexible U-frame, a pivot upon each arm of the frame, and an adjustable stop $g$ upon one of the pivots, substantially as set forth.

DANIEL C. BOLEY.

Witnesses:
EDW. S. EVARTS,
H. M. MUNDAY.